United States Patent [19]

Ono

[11] Patent Number: 5,758,055
[45] Date of Patent: May 26, 1998

[54] METHOD/APPARATUS HAVING AN ALTERNATE MEANS OF INITIALIZING AN INFORMATION PROCESSING SYSTEM

[75] Inventor: Kenichi Ono, Tokyo, Japan

[73] Assignee: Canon Kabushiki Kaisha, Tokyo, Japan

[21] Appl. No.: 982,438

[22] Filed: Nov. 27, 1992

[30] Foreign Application Priority Data

Dec. 3, 1991 [JP] Japan .................... 3-319074

[51] Int. Cl.$^6$ ............................................. G06F 13/00
[52] U.S. Cl. ..................... 395/182.05; 395/183.01
[58] Field of Search ............................. 395/575, 700, 395/182.01, 182.21, 182.05, 183.01

[56] References Cited

U.S. PATENT DOCUMENTS

| | | | |
|---|---|---|---|
| 4,590,557 | 5/1986 | Lillie | 364/200 |
| 5,210,875 | 5/1993 | Bealkowski et al. | 395/700 |
| 5,214,695 | 5/1993 | Arnold et al. | 380/4 |
| 5,274,816 | 12/1993 | Oka | 395/700 |
| 5,297,282 | 3/1994 | Meilak et al. | 395/700 |

FOREIGN PATENT DOCUMENTS

| | | | |
|---|---|---|---|
| 0364115 | 4/1990 | European Pat. Off. | G06F 9/445 |
| 0364127 | 4/1990 | European Pat. Off. | G06F 9/445 |

*Primary Examiner*—Robert W. Beausoliel, Jr.
*Assistant Examiner*—Norman M. Wright
*Attorney, Agent, or Firm*—Fitzpatrick, Cella, Harper & Scinto

[57] ABSTRACT

An information processing apparatus including a reader for reading out first initializing information which initializes the information processing apparatus from first storage means, and an analyzer for analyzing the first initializing information read out by the reader. When the analyzer detects an error a determination is made as to whether or not a command to avoid an error is input. A controller, when it is determined that the command is input, reads out second initializing information different from the first initializing information from second storage means and initializes the information processing apparatus based on the second initializing information.

32 Claims, 3 Drawing Sheets

METHOD/APPARATUS HAVING AN ALTERNATE MEANS OF INITIALIZING AN INFORMATION PROCESSING SYSTEM

BACKGROUND OF THE INVENTION

The present invention relates to an apparatus and method for information processing and, more particularly, to an apparatus and method for information processing which sets various initial-value information when power is supplied to the apparatus or a system including the apparatus.

At a boot-up processing in a conventional apparatus, a default file which stores initial-value information (default values) of the apparatus (generally stored in an external storage unit such as a hard disk and floppy disk) is accessed, the initial-value information is read out from the file, and the read-out values are set as initial values for the apparatus. In the process of the initial-value being read out and set, when the default file cannot be read out or an error in the default file is detected, initialization processing along with the boot-up processing cannot proceed and is interrupted.

In the conventional apparatus, in the case where an error occurs an operator has to repeat the boot-up operation by setting the other default file storing correct default values to the external storage unit, which results in inconvenience.

SUMMARY OF THE INVENTION

Accordingly, it is an object of the present invention to cope with the above-described drawback by providing an apparatus and method for information processing which executes a boot-up processing regardless of existence of errors in initial-value information.

It is another object of the present invention to provide an apparatus and method for information processing which continues the boot-up processing (initial-value setting processing) without a power on/off operation in a case where an error in the default information is detected in a process of reading the default information from the external memory unit.

It is another object of the present invention to provide an apparatus and method for information processing which can proceed the apparatus boot up, when an error is detected in the process of initial-value information reading or analysis, by ignoring the error and executing an initialization of the apparatus with the initial values which are internally stored in the apparatus.

It is another object of the present invention to provide an apparatus and method for information processing which can correct the default information so as to correspond to the configuration of an apparatus or system, when the default information and configuration are compared and they do not correspond to each other.

According to the present invention, the foregoing object is attained by providing an information processing apparatus which is put in a ready state based on default information, comprising: input means for inputting default information from an external storage; judgement means for judging whether or not the apparatus can be put in a ready state based on the default information which is inputted from the external storage unit; and put-in-ready-state means for putting the apparatus in a ready state by invalidating the default information in a case where it is judged that the apparatus cannot be put in a ready state.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail in accordance with the accompanying drawings.

At the boot-up processing for the apparatus or system in the present embodiment, when default information is read from an external storage unit and analyzed, even if an error in the default information is detected, the boot-up processing can be continued by ignoring information including the error, reading default values which are internally stored with the control program in the apparatus, and setting them as initial values.

The default information in a printing unit, for example, includes information on configuration of the system, system control, character sets, and printing data format. Examples of the default information are as follows:

I. Information on Configuration
  A. The type of external memory and memory capacity of a connected hard disk, floppy disc, or magnetic tape.
  B. Information on the type of connected host computer.
  C. Memory capacity setting for input/output buffer and page buffer.
  D Storage area setting for character sets.
II. Information on System Control
  A. Control information for input medium for inputting printing data, i.e., data format of a magnetic tape, recording format, or code system.
  B. Warning alarm on/off and billing information storage.
III. Information on Character Set
  A. Designation of character set to be registered and loading area in a memory.
  B. Method for processing when an undefined code or unregistered code occurs, e.g. the order of external memory searching for a pertinent code.
IV. Printing Data Format
  A. Printing data recording format
  B. Functional code selection (depending on a host computer)
  C. Default character type-style setting

The First Embodiment

Figure 1:
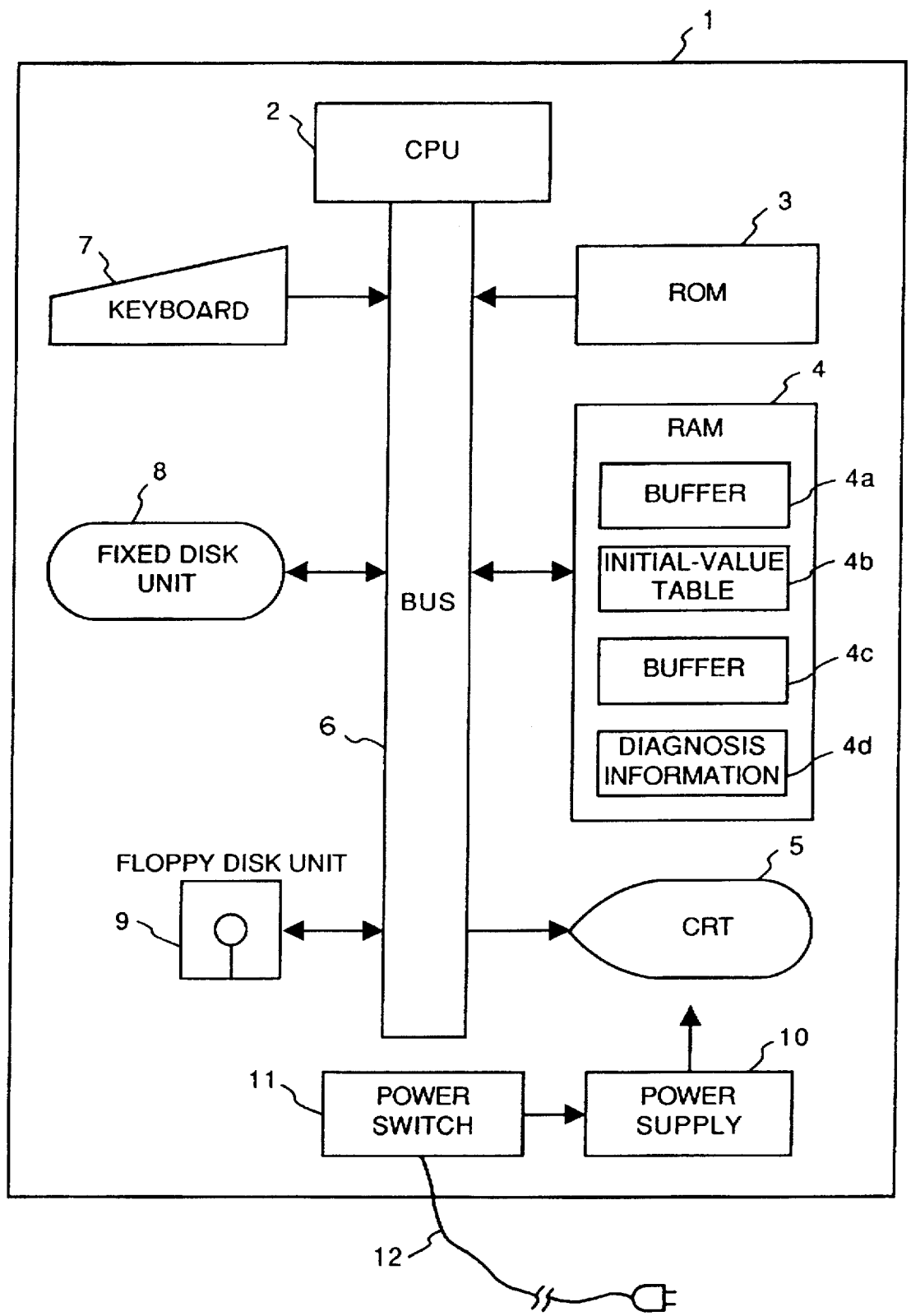
FIG. 1 is a block diagram illustrating a configuration of the information processing apparatus of an embodiment according to the present invention.

FIG. 1 is a block diagram of the information processing apparatus according to the present invention. In FIG. 1, numeral 1 is an information processing apparatus comprising the components which are respectively numbered from 2 to 9. Numeral 2 is a CPU which performs control operation over the whole apparatus in accordance with a control program (shown in FIG. 2) which is stored in ROM 3 in advance.

Figure 2:
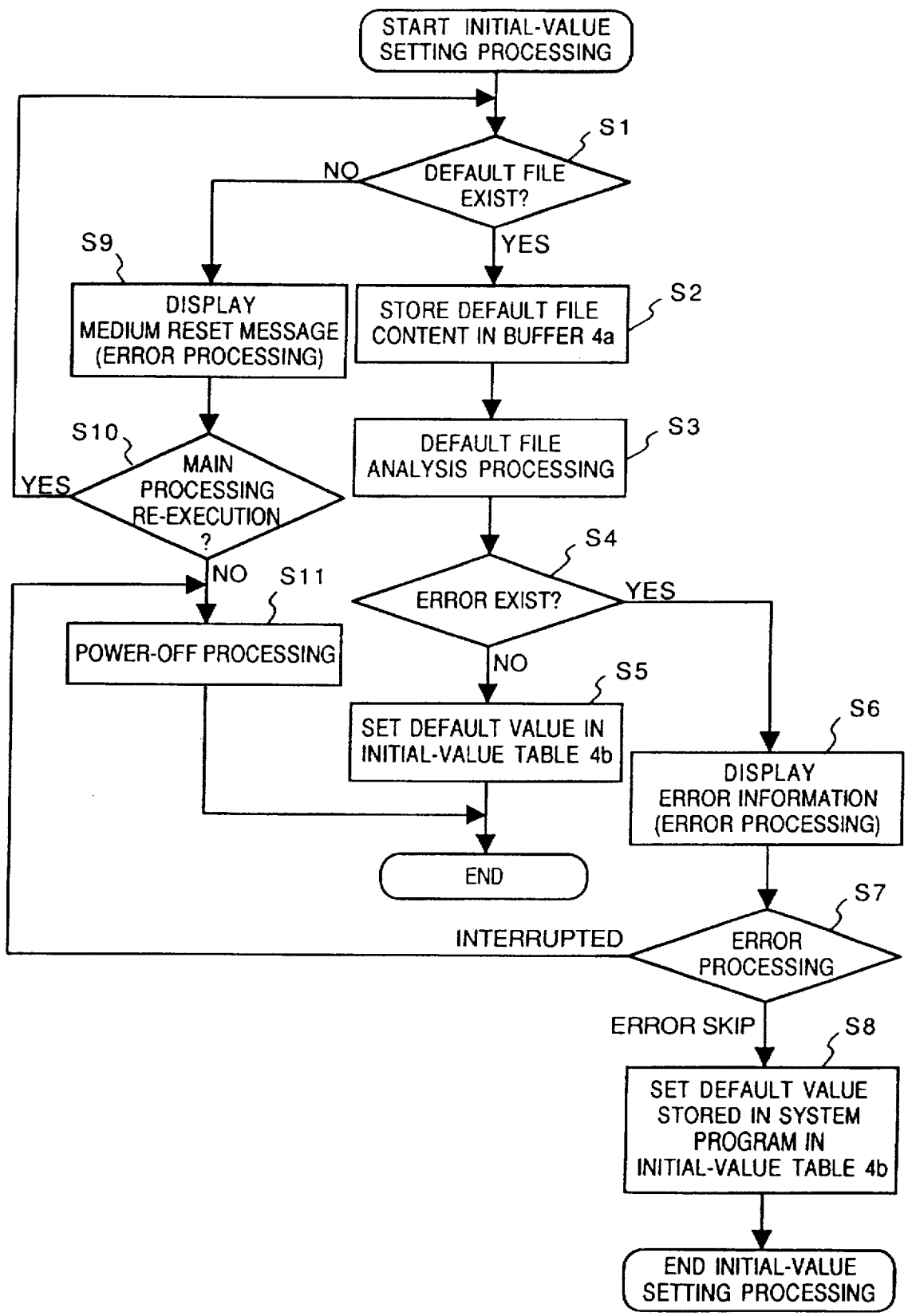
FIG. 2 is a flowchart illustrating a procedure of the controlling operation of the present embodiment.

The ROM 3 stores data such as constant values other than an error processing program and control programs including the program according to the flowchart in FIG. 2. Numeral 4 is a RAM which is used for a work area where various data are temporary stored in the process of the processing executed by the CPU 2. The RAM 4 comprises a buffer 4a which temporary stores content of the file read from a fixed hard disk unit 8 or floppy disk unit 9, an initial-value table 4b which sets initial values of the apparatus, that is, default values, based on the content of the buffer 4a, a buffer 4c which temporary stores command series inputted from a keyboard 7, and diagnosis information 4d which stores data indicating a configuration of the apparatus detected by a self-diagnosis function (to be described later). Numeral 5 is a display unit such as CRT, however, it can be replaced by an LCD. Numeral 6 is a bus which respectively connects each of these units.

The keyboard 7 has various keys for an operation to continue the processing regardless of the presence of an error in the default information or to interrupt the process in addition to character keys and function keys. The fixed hard disk unit 8 stores a default file and floppy disk unit 9 is used in a similar way to the fixed disk unit 8. Numeral 10 is a power supply unit which supplies power to each unit of the apparatus 1. Numeral 11 is a power switch which turns on/off the power supply to the power supply unit 10, and numeral 12 is an alternating current power source.

FIG. 2 is a flowchart illustrating a procedure of the controlling operation of the CPU 2 when the power is supplied to the apparatus 1 by turning on/off the power switch 11. When the processing for default file reading is executed at the boot-up, the routine of the default file processing as shown in FIG. 2 is executed.

At step S1, when power of the system or apparatus is turned on, it is examined whether or not the default file exists either in the fixed hard disk unit 8 or floppy disk unit 9. If the default file exists in one of these, the process proceeds to step S2 where the content of a pertinent default file is read out from the fixed hard disk unit 8 or floppy disk unit 9 and stored in the buffer 4a in the RAM 4.

When the default file exists neither in the hard disk unit 8 nor the floppy disk unit 9, the process proceeds to step S9 where an error display processing is executed. In the error processing, an operator is required to set a medium containing the default file to the floppy disk unit 9 by a message on the CRT 5. At step S10, if a command for re-execution is inputted from the keyboard 7, the process returns to step S1 where the existence of the default file is examined. If a command for processing interruption is inputted from the keyboard 7 by the operator at step S10, the process proceeds to step S11 where a predetermined power-off processing is performed to turn off the power of the apparatus.

On the other hand, at step S3, processing for default file analysis is performed based on the content stored in the buffer 4a at step S2. At step S4, it is judged whether or not there is an error in the default file. If there is no error, the process proceeds to step S5 where default setting values are written in the initial-value table 4b of the RAM 4 based on the content of the buffer 4a.

When an error is detected by the judgement at step S4, the process proceeds to step S6 where a massage that the error is detected in the default file is displayed on the CRT 5. The process then proceeds to step S7 where an instruction inputted by the operator is waited. If the operator inputs an error skip command by using the keyboard 7, at step S8 the error is ignored and the default values which are stored in the ROM 3 with internal programs are set in the initial-value table 4b and the initial-value setting processing is ended. If the operator inputs a processing interruption command from the keyboard 7, the process proceeds to step S11 where power-off processing is performed to turn off the power of the apparatus 1.

In the above embodiment, when an error is detected during the analysis of the default file which is read from the floppy disk 9, the error skip is executed and the initial values of the control program which is stored in the ROM 3 are automatically set. In addition to this, it can be arranged so that the standard default file of the fixed hard disk unit 8 is read out and analyzed.

An example of errors which can be detected at step S4 is a case where a code system which is not supported by the host computer designated by the default file, case where the capacity of character set information which is set by default information exceeds the memory area for the character set which is set by the default information, or case where another external memory is designated by the default information as an object for search, even if only a hard disk is connected as an external memory unit.

In these cases, error information is displayed. For example, when the code system which is not supported by the host computer is designated, information on the code system is determined as error-and an appropriate code system which is stored in the internal memory or in the other external memory unit is set as initial information. When the capacity of the character set exceeds the memory area for the character sets, the character set information for a portion which exceeds the memory area is not registered in the memory and starts the apparatus. Furthermore, when the external memory unit which is not connected is designated, the external memory unit which is actually connected can be detected by the self diagnosis or the like. In case of setting of the initial-value information based on the self diagnosis, if input printing data through an off-line mode is designated by the default information, but condition for the off-line input is not set and a communication board for on-line mode is set, it can be arranged so that the setting information for the off-line mode in the default information is ignored and it is switched to the printing data input through the on-line mode.

Figure 3:
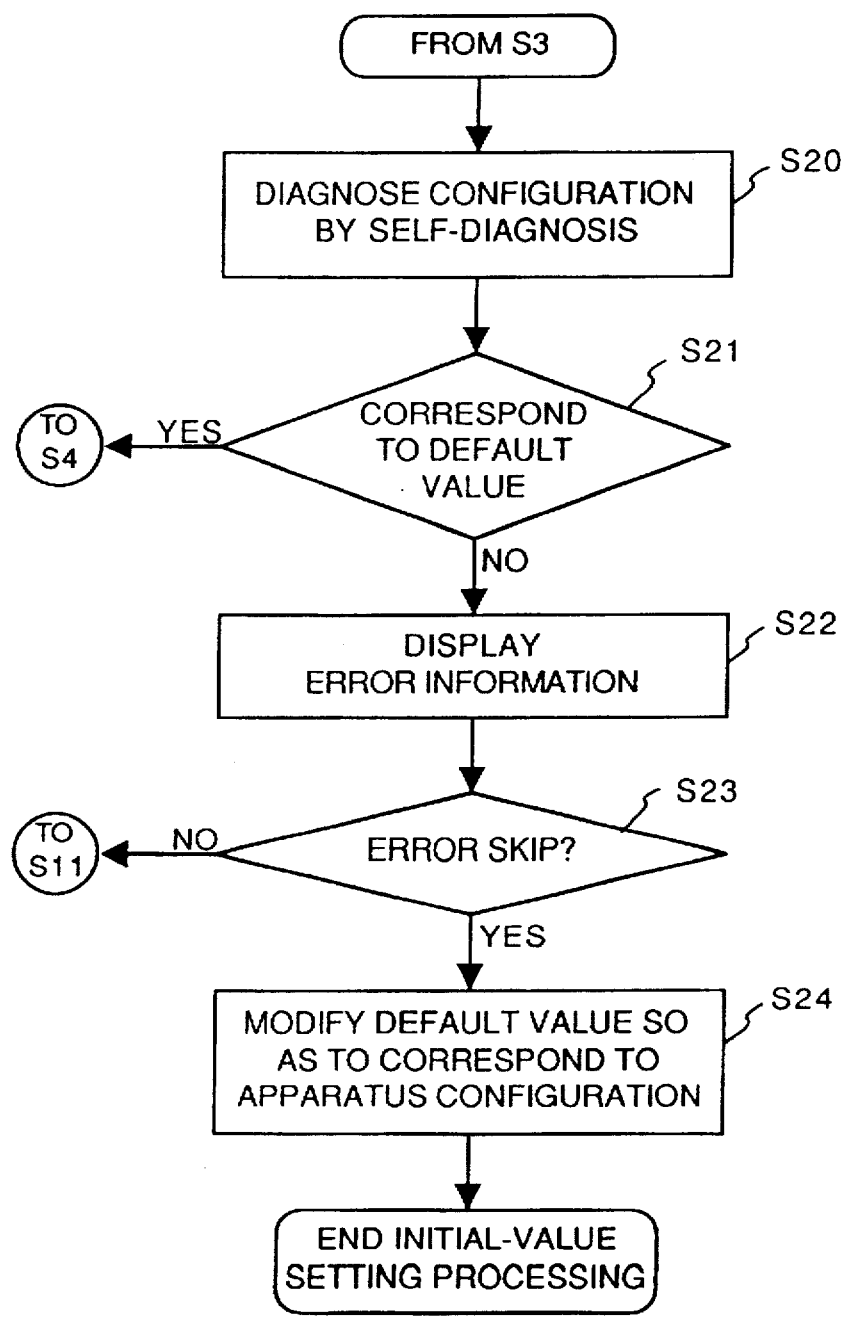
FIG. 3 is a flowchart illustrating a procedure of the controlling operation of the other embodiment.

FIG. 3 is a flowchart illustrating the above-mentioned procedure. This processing is executed after the processing at step S3 of the flowchart in FIG. 2 and the control program which executes this processing is stored in the ROM 3.

When the default file is analyzed at step S3 of FIG. 2, the process proceeds to step S20 where configuration of the hardware is examined by self-diagnosis function and the result is stored in the RAM 4 as diagnosis information 4d. The process then proceeds to step S21 where it is examined whether or not the self-diagnosis information 4d corresponds to the content instructed by the default file. If coincided, the process proceeds to step S4 (FIG. 2) where the above-described processing is executed.

On the other hand, if not, the process proceeds to step S22 where the error information is displayed and the designation for the error skip is inputted from the keyboard 7 in similar manner to steps S6 and S7 (step S23). When the error skip is designated, the process proceeds to step S24 where default information is corrected so as to correspond to the configuration of the apparatus 1 which is stored in the diagnosis information 4d.

As described above, according to the present embodiments, when the default file is analyzed at the system boot-up, if data error in the default file is detected, errors can be ignored by a simple operation and the boot-up processing can be continued.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus, comprising:
   reading means for reading out first initializing information which sets initial values in said information processing apparatus from first storage means;
   analyzing means for analyzing the first initializing information read out by said reading means and for detecting an error;
   determination means for, when said analyzing means has detected an error, waiting for an input of a command and for determining whether or not the command is a command to avoid the error; and
   control means for, when said determination means determines that the command to avoid the error is input, reading out second initializing information different from the first initializing information from second storage means, and for setting the second initializing information in said information processing apparatus as the initial values of the apparatus,
   wherein the first or the second initializing information includes data concerning the type of a memory and the capacity of that memory.

2. The apparatus according to claim 1, wherein said first storage means is a detachable external memory device to said information processing apparatus.

3. The apparatus according to claim 1, wherein the command is input into said information processing apparatus by using a keyboard.

4. The apparatus according to claim 1, wherein said second storage means is an internal memory of said information processing apparatus.

5. The apparatus according to claim 1, wherein the memory is an external memory, and the first or second information includes data concerning the type of the external memory and the capacity of the external memory.

6. The apparatus according to claim 1, wherein the first or second information includes data concerning the type of a host computer connected to said apparatus.

7. The apparatus according to claim 1, wherein the first or second information includes data concerning the capacity of an input/output buffer or a page buffer.

8. The apparatus according to claim 1, wherein the first or second information includes data concerning a storage area of a character set.

9. The apparatus according to claim 1, wherein the first or second information includes control information for an input medium that inputs print data.

10. The apparatus according to claim 1, wherein the first or second information includes data concerning a registered character set.

11. The apparatus according to claim 1, wherein the first or second information includes data concerning a method for processing when an undefined code set is input.

12. The apparatus according to claim 1, wherein the first or second information includes data concerning a printing format of printing data.

13. The apparatus according to claim 1, wherein the first or second information includes data concerning a selection of functional codes.

14. The apparatus according to claim 1, wherein the first or second information includes data concerning setting of a default character set.

15. An information processing method executed in an information processing apparatus, comprising the steps of:
    reading out first initializing information which sets initial values in the information processing apparatus from first storage means;
    analyzing the first initializing information and detecting an error;
    determining whether or not a command to avoid the error is input, when an error has been detected in said analyzing step;
    reading out second initializing information different from the first initializing information from a second storage means, when said determining step determines that the command to avoid the error is input; and
    setting the second initializing information in the information processing apparatus as the initial values of the apparatus,
    wherein the first or the second initializing information includes data concerning the type of a memory and the capacity of that memory.

16. The method according to claim 15, wherein the first storage means is a detachable external memory device to said information processing apparatus.

17. The method according to claim 15, wherein the command is input into said information processing apparatus by using a keyboard.

18. The method according to claim 15, wherein the second storage means is an internal memory of the information processing apparatus.

19. The method according to claim 15, wherein the memory is an external memory, and the first or second information includes data concerning the type of the external memory and the capacity of the external memory.

20. The method according to claim 15, wherein the first or second information includes data concerning the type of a host computer connected to the apparatus.

21. The method according to claim 15, wherein the first or second information includes data concerning the capacity of an input/output buffer or a page buffer.

22. The method according to claim 15, wherein the first or second information includes data concerning a storage area of a character set.

23. The method according to claim 15, wherein the first or second information includes control information for an input medium that inputs print data.

24. The method according to claim 15, wherein the first or second information includes data concerning a registered character set.

25. The method according to claim 15, wherein the first or second information includes data concerning a method for processing when an undefined code set is input.

26. The method according to claim 15, wherein the first or second information includes data concerning a printing format of printing data.

27. The method according to claim 15, wherein the first or second information includes data concerning a selection of functional codes.

28. The method according to claim 15, wherein the first or second information includes data concerning setting of a default character set.

29. A memory medium storing a control program implemented by an information processing apparatus, the medium comprising:
- a program module for reading out first initializing information which sets initial values in the information processing apparatus from a first storage means;
- a program module for analyzing the first initializing information and detecting an error;
- a program module for determining whether or not a command to avoid the error is input, when the error is detected;
- a program module for reading out second initializing information different from the first initializing information from a second storage means, when the command is input; and
- a program module for setting the second initializing information in the information processing apparatus as the initial values of the apparatus,
- wherein the first or the second initializing information includes data concerning the type of a memory and the capacity of that memory.

30. The medium according to claim 29, wherein the program module for determining is constructed to determine, as the command to avoid the error, a command input into the information processing apparatus by using a keyboard.

31. A computer program product located on a computer readable medium, for controlling an information processing apparatus, the program product comprising:
- a program module for reading out first initializing information which sets initial values in the information processing apparatus from a first storage means;
- a program module for analyzing the first initializing information and detecting an error;
- a program module for determining whether or not a command to avoid the error is input, when the error is detected by said analyzing module;
- a program module for reading out second initializing information different from the first initializing information from a second storage means, when input of the command is determined by said determining module; and
- a program module for setting the second initializing information in the information processing apparatus as the initial values of the apparatus,
- wherein the first or the second initializing information includes data concerning the type of a memory and the capacity of that memory.

32. The program product according to claim 31, wherein the program module for determining is constructed to determine, as the command to avoid the error, a command input into the information processing apparatus by means of a keyboard.

* * * * *